Oct. 21, 1969 J. H. FOX 3,473,311
GRAPE HARVESTER
Filed Jan. 26, 1968 9 Sheets-Sheet 3
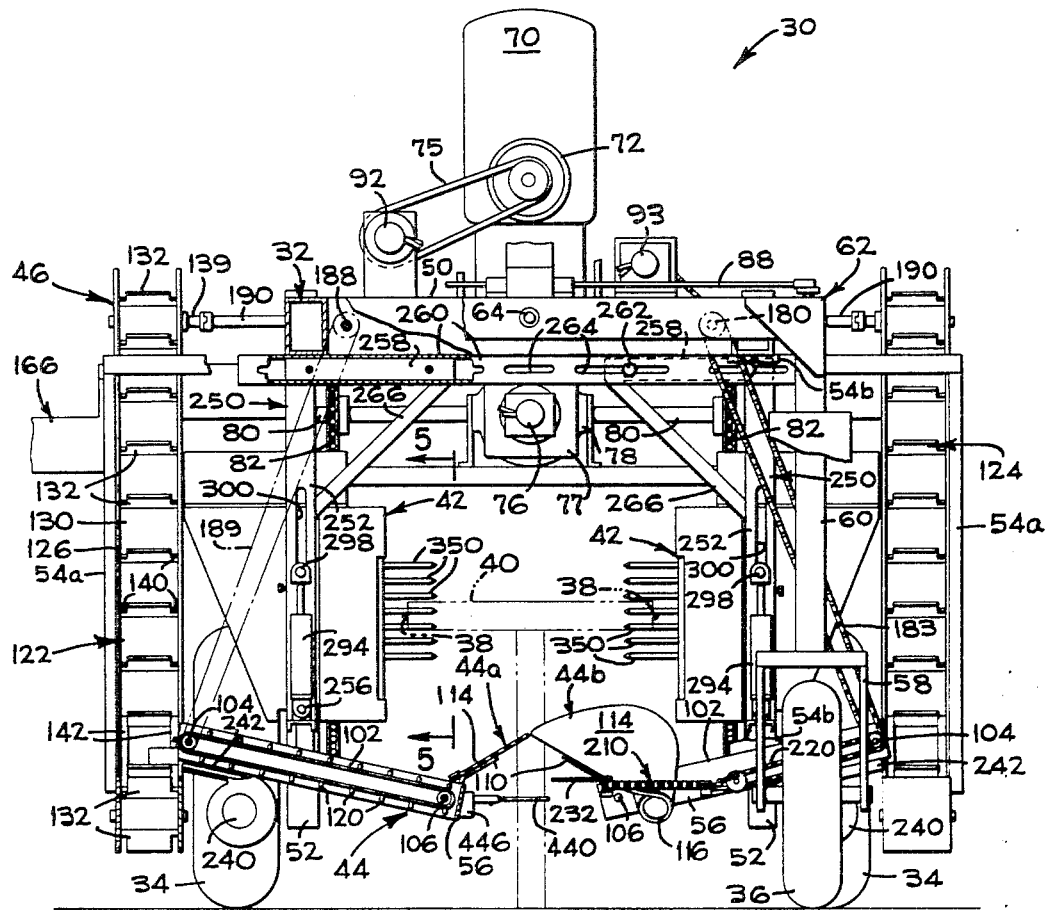
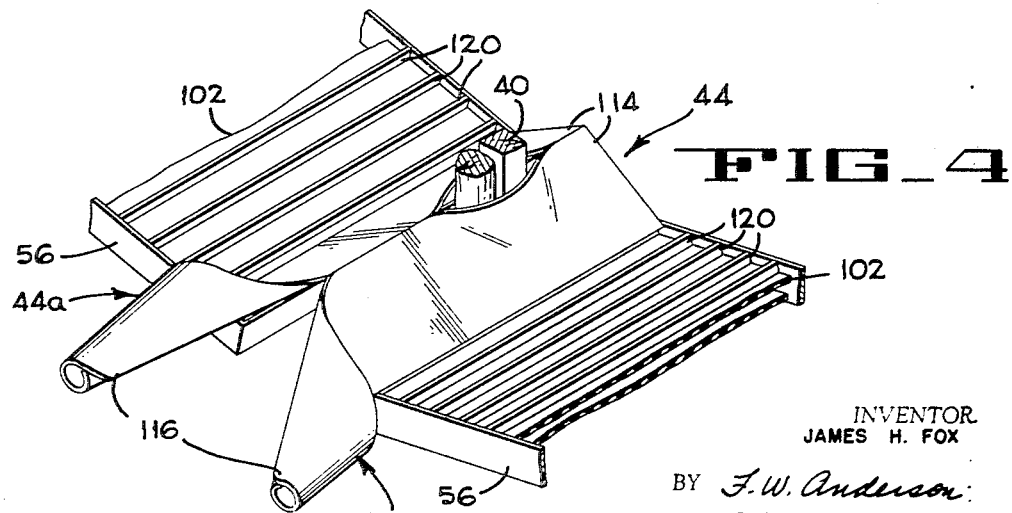
INVENTOR.
JAMES H. FOX
BY F.W. Anderson
C.E. Tripp
ATTORNEYS Oct. 21, 1969  J. H. FOX  3,473,311
GRAPE HARVESTER
Filed Jan. 26, 1968  9 Sheets-Sheet 4
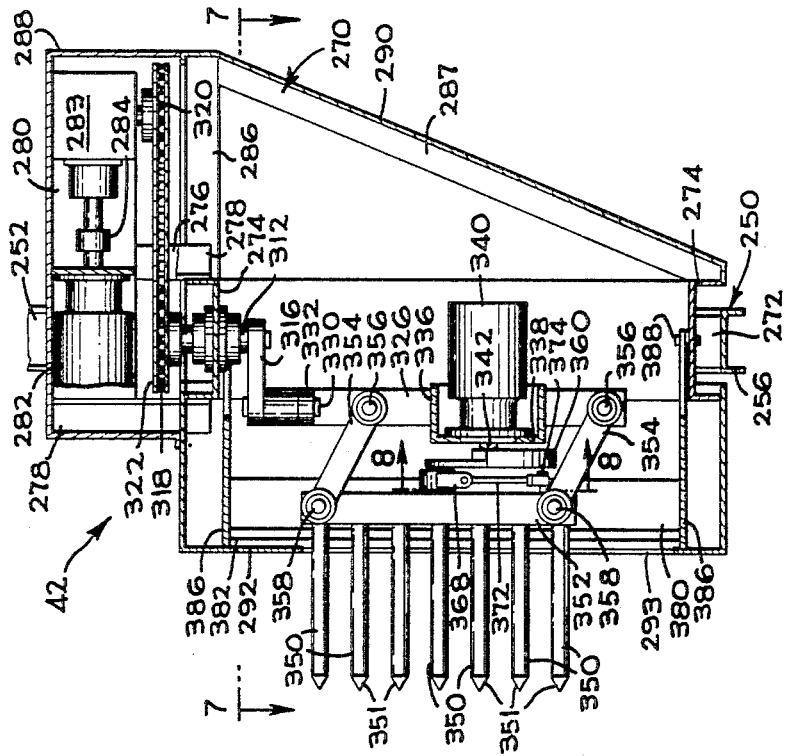
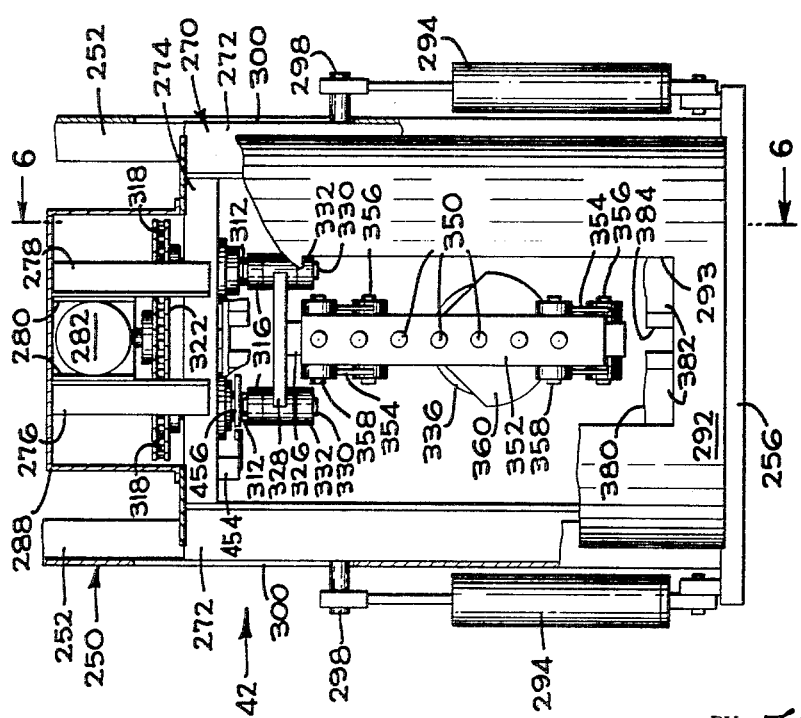
INVENTOR.
JAMES H. FOX
BY F. W. Anderson
C. E. Tripp
ATTORNEYS Oct. 21, 1969  J. H. FOX  3,473,311
GRAPE HARVESTER
Filed Jan. 26, 1968  9 Sheets-Sheet 5
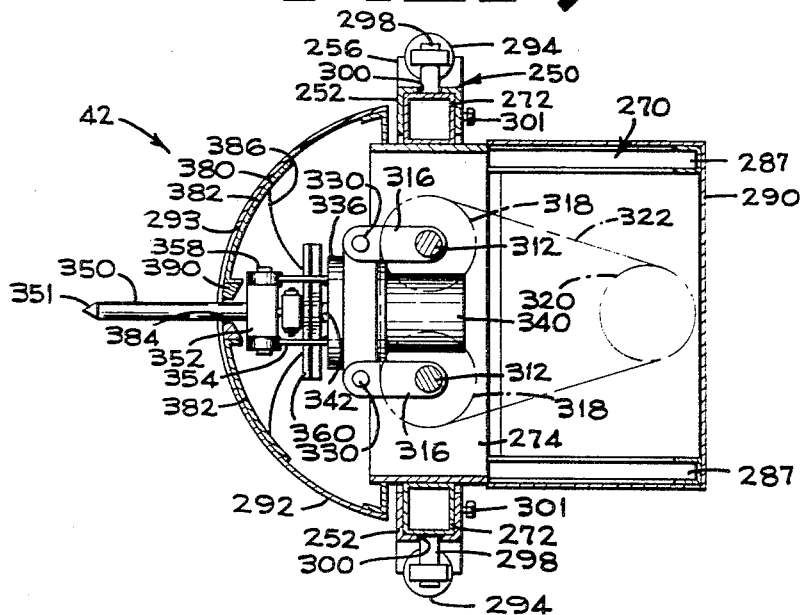
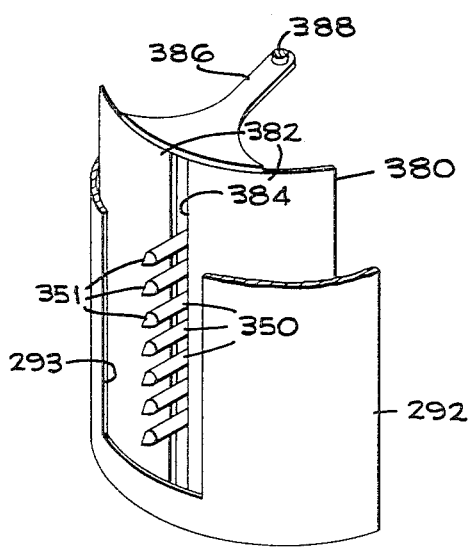
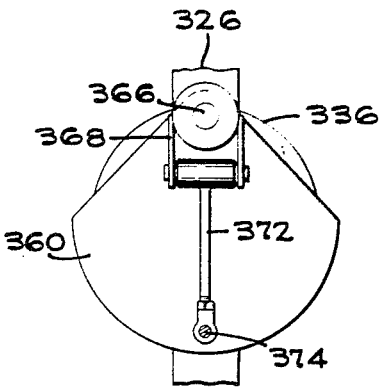
INVENTOR.
JAMES H. FOX
BY J.W. Anderson
C.E. Tripp
ATTORNEYS

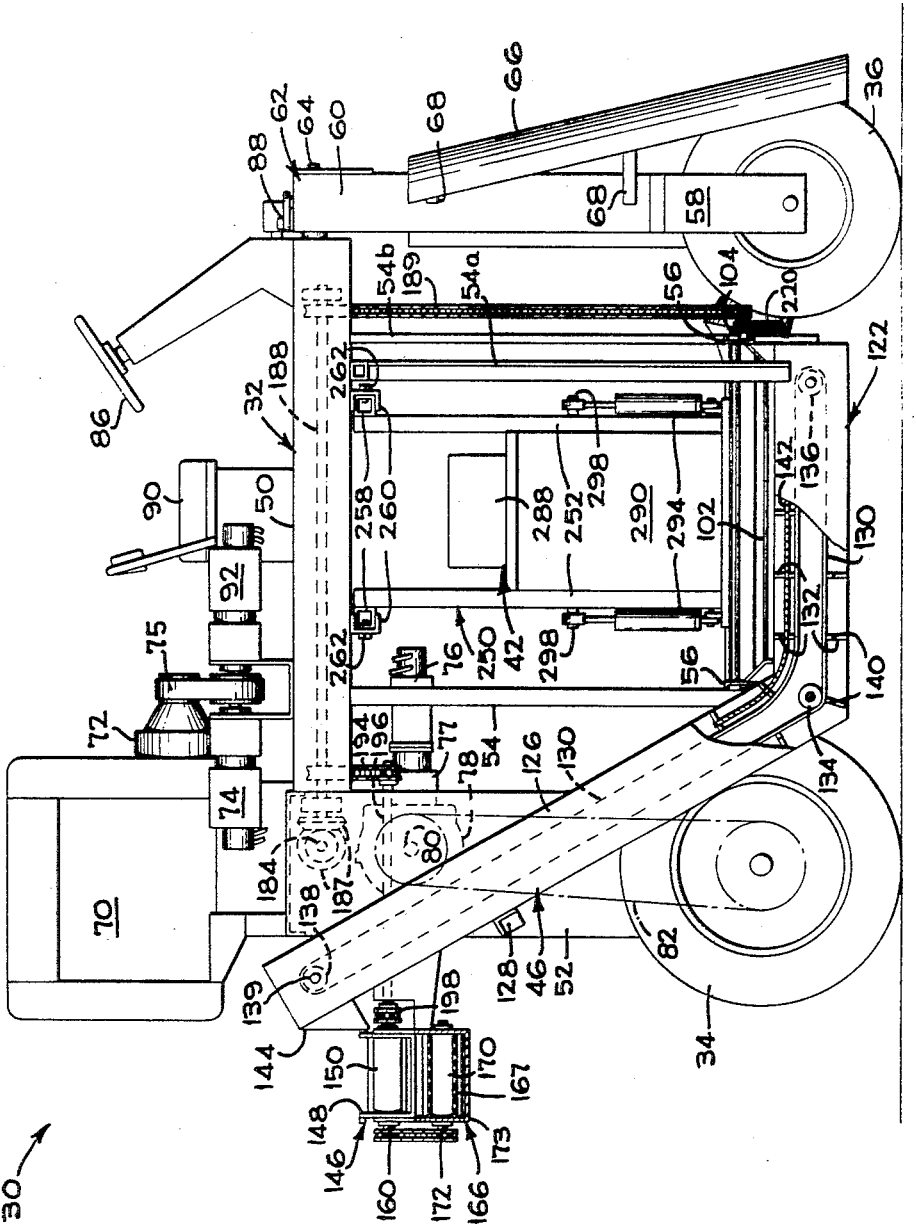

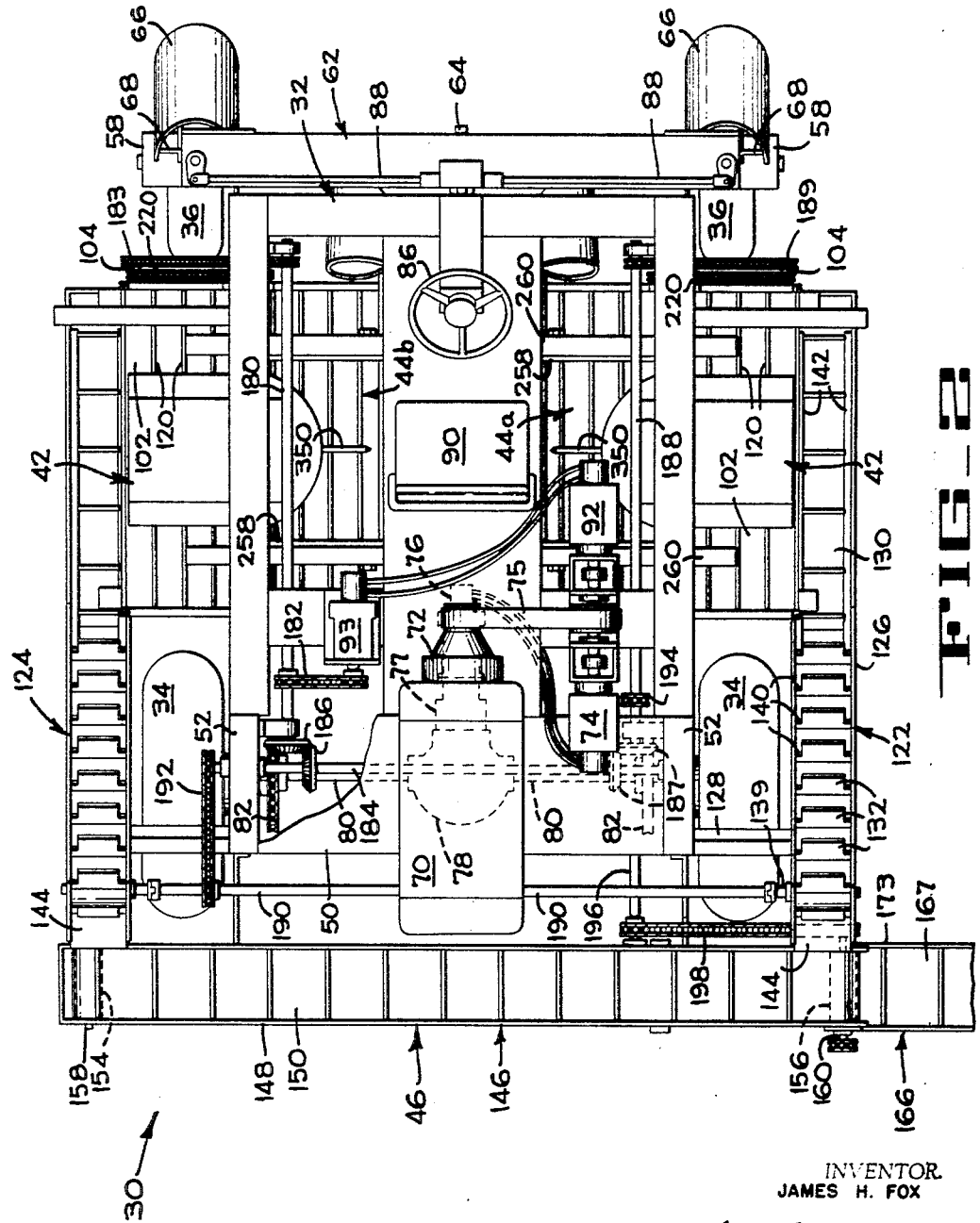

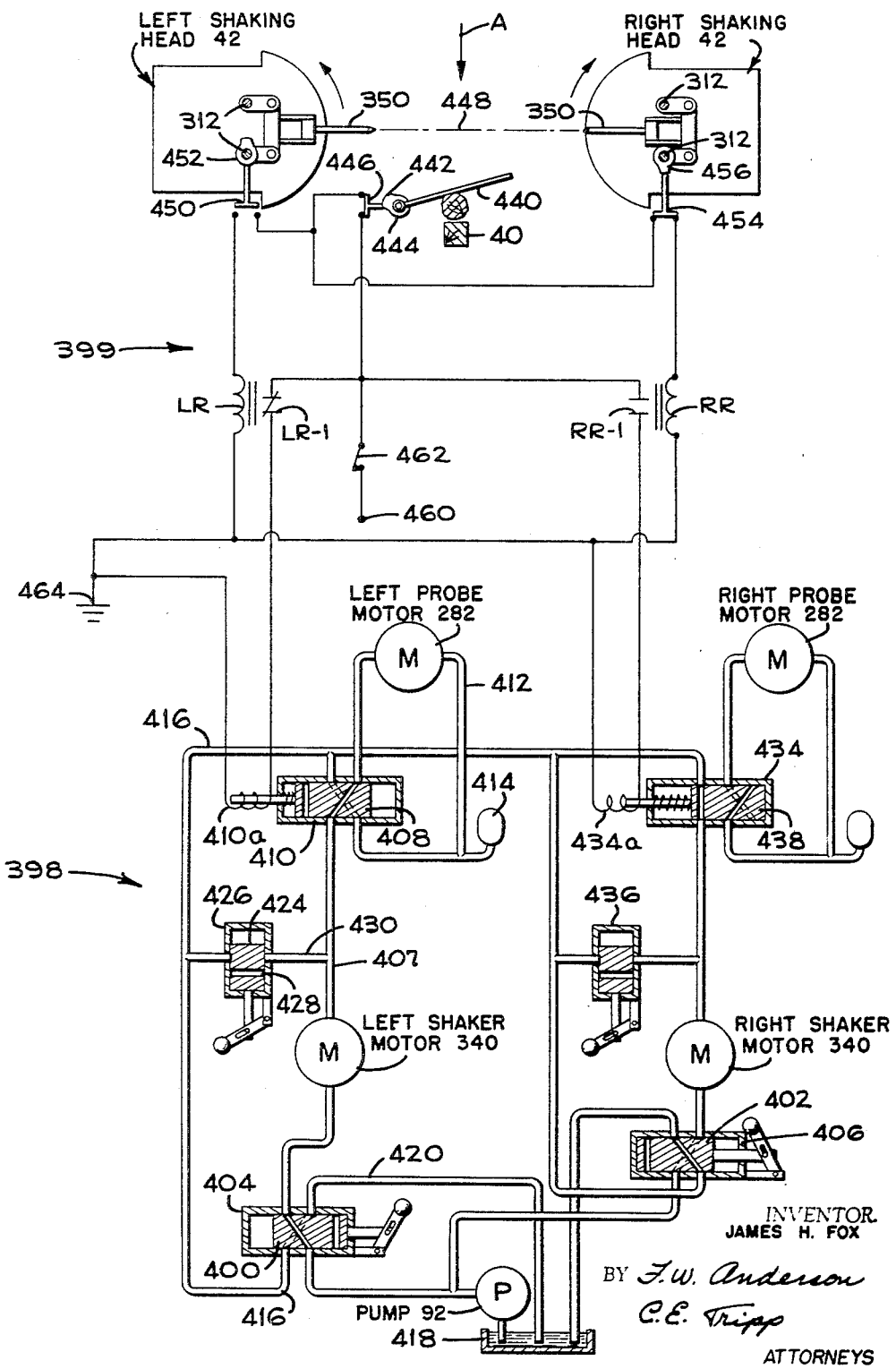

Oct. 21, 1969     J. H. FOX     3,473,311
GRAPE HARVESTER
Filed Jan. 26, 1968     9 Sheets-Sheet 7
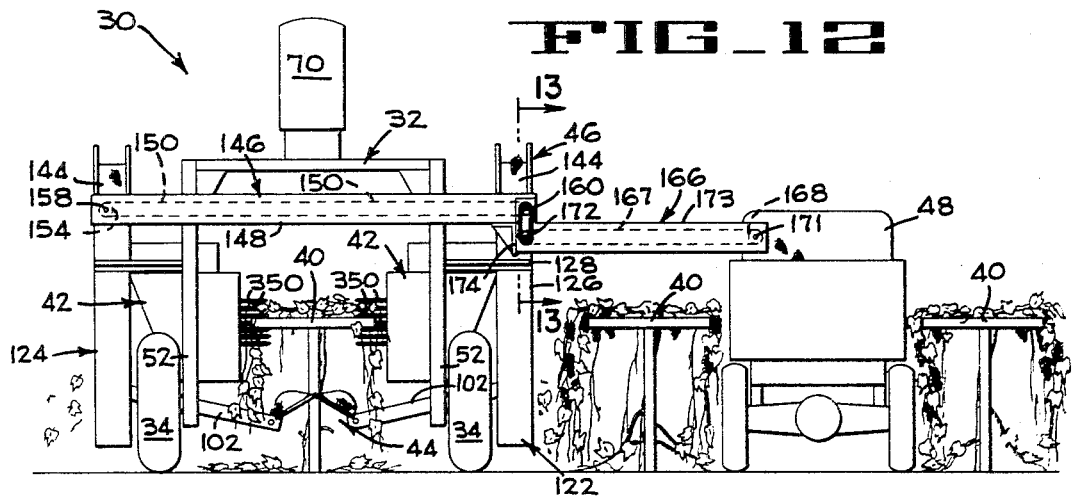
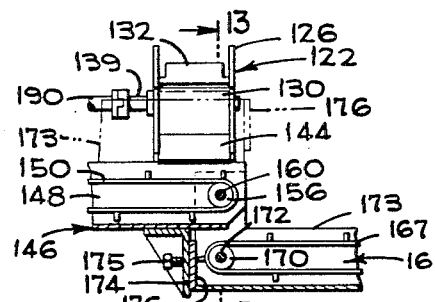
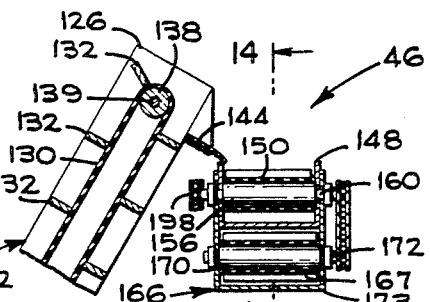
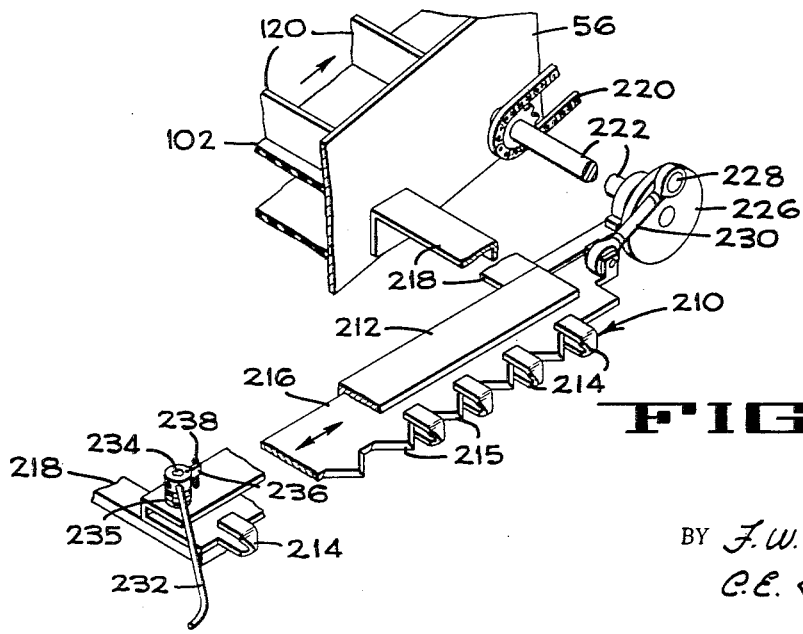
INVENTOR
JAMES H. FOX
BY F. W. Anderson
C. E. Tripp
ATTORNEYS Oct. 21, 1969     J. H. FOX     3,473,311
GRAPE HARVESTER
Filed Jan. 26, 1968     9 Sheets-Sheet 8
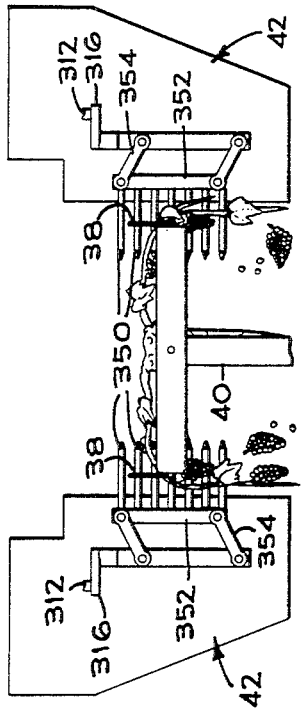
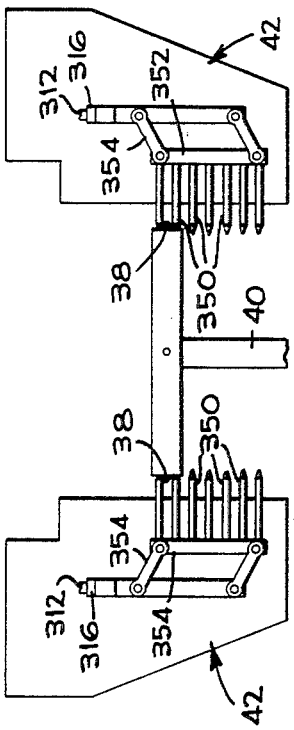
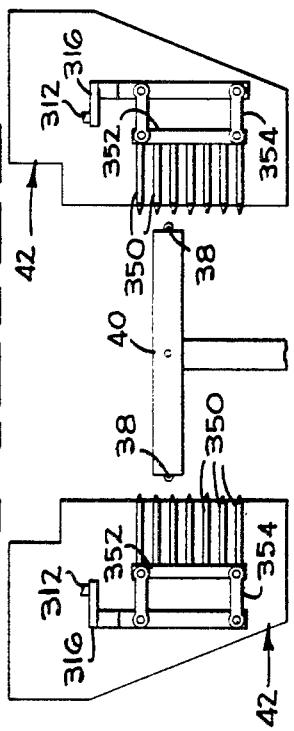
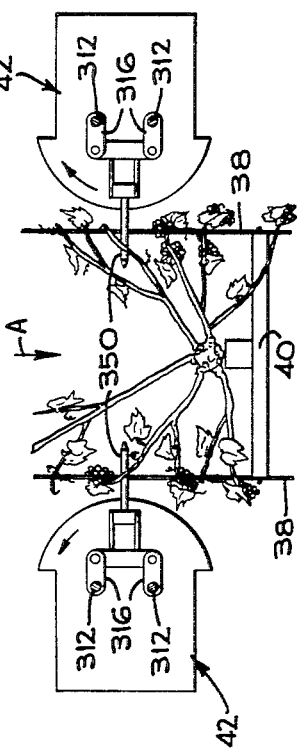
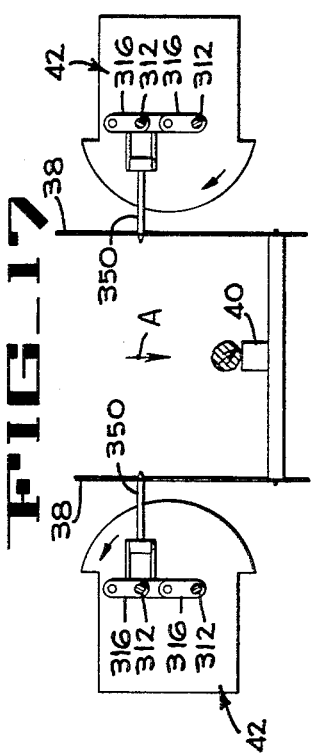
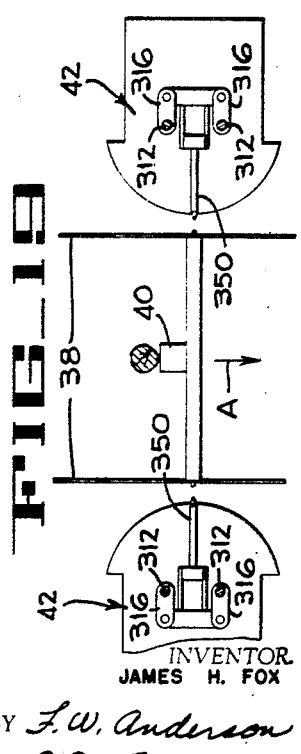
INVENTOR.
JAMES H. FOX
BY *F. W. Anderson*
*C. E. Tripp*
ATTORNEYS Oct. 21, 1969    J. H. FOX    3,473,311
GRAPE HARVESTER
Filed Jan. 26, 1968    9 Sheets-Sheet 9
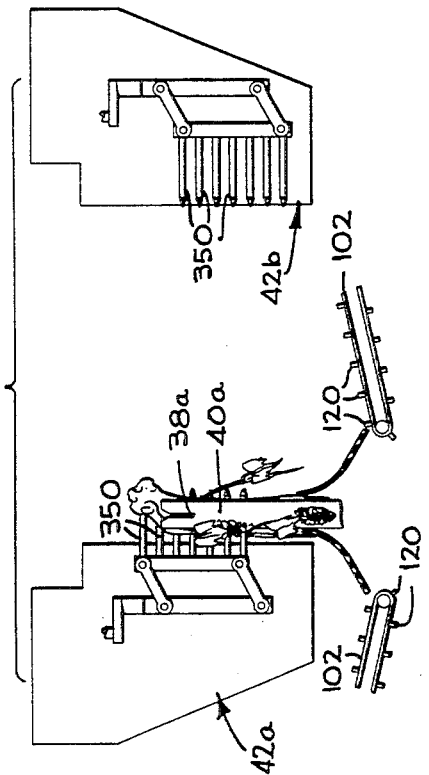
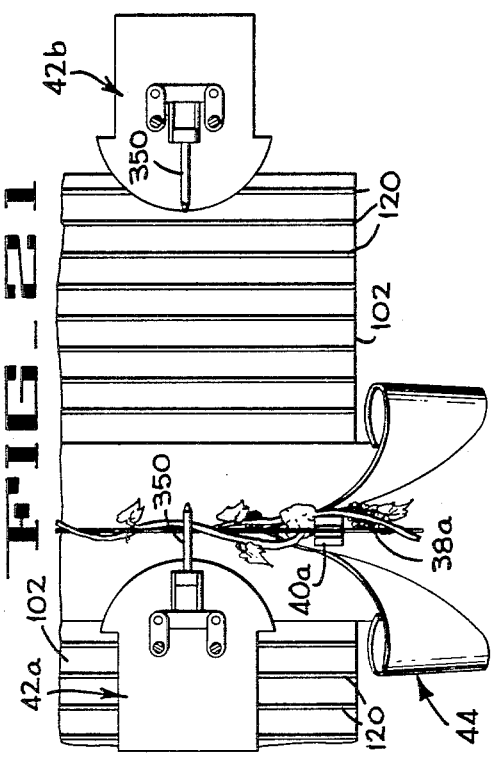
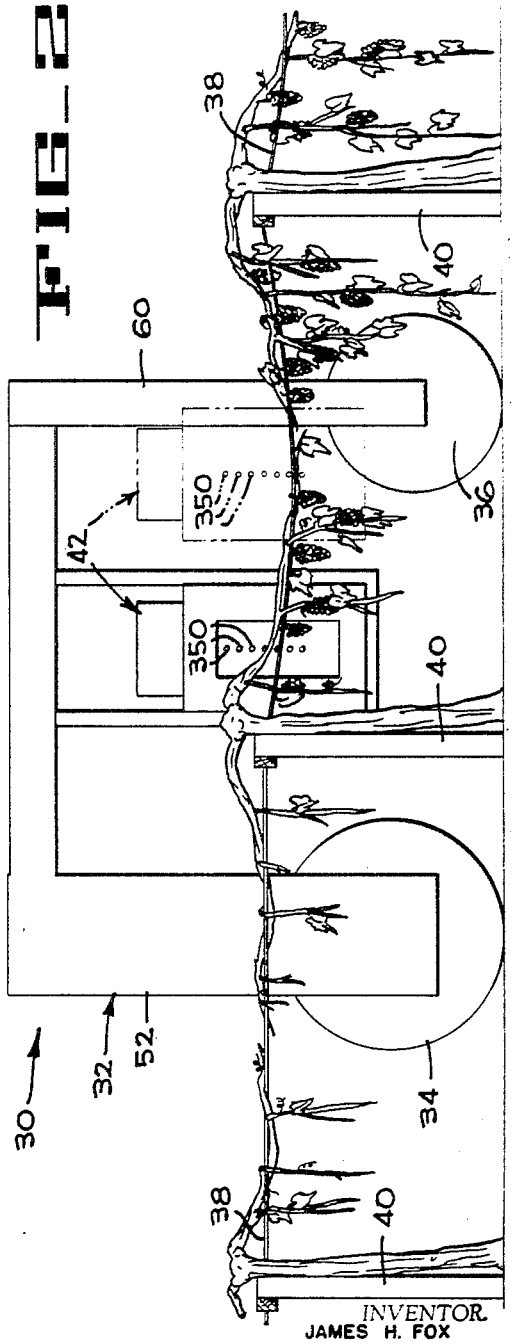
INVENTOR.
JAMES H. FOX
BY *F. W. Anderson*
*C. E. Tripp*
ATTORNEYS United States Patent Office 3,473,311
Patented Oct. 21, 1969

3,473,311
GRAPE HARVESTER
James H. Fox, San Jose, Calif., assignor to FMC Corporation, San Jose, Calif., a corporation of Delaware
Filed Jan. 26, 1968, Ser. No. 700,921
Int. Cl. A01g 19/00
U.S. Cl. 56—330
10 Claims

ABSTRACT OF THE DISCLOSURE

A mobile grape harvester for straddling trellis supported vines and for shaking grapes therefrom in bunches and/or as individual berries. A shaker on the harvester having a plurality of vertically spaced fingers on both sides of the vine which simultaneously oscillate vertically and horizontally into and out of engagement with the vines and trellis wires, the horizontal oscillating movement of the fingers when contacting the vine being in a direction opposite to the direction of harvester movement for minimizing horizontal movement of the fingers relative to the vine during shaking. A grape collecting mechanism below the shakers automatically seals about the trellis posts and vine stumps and includes a conveying system for transporting the grapes to a truck or gondola.

CROSS REFERENCE TO RELATED PATENTS

The subject grape harvester is an improvement over the type of harvesters disclosed in U.S. Lamouria Patent No. 2,893,194 and Shepardson Patent No. 3,328,944. The Lamouria patent discloses a harvester which includes means for cutting the bunches of grapes from trellis supported vines after first forcing the bunches below the trellis wires, whereas the Shepardson patent discloses a free rolling, vertically reciprocated wheel having shaking fingers projecting radially therefrom and into the vine to shake the same.

BACKGROUND OF THE INVENTION

This invention pertains to an improved harvester for harvesting grapes or similar vine borne fruit. The preferred embodiment of the harvester disclosed herein is designed to handle wine grapes trained upon trellis wires, although it will be understood that the harvester may be modified to handle trellis supported raisin grapes if desired.

Certain prior art harvesters, as well as the harvester of the present invention, are designed to harvest vineyards having rows of grapes trained upon trellises. The grape vines in each trellis row are usually spaced about eight feet apart, and a trellis post which extends above the ground about four feet is placed immediately adjacent the stump of each vine. A horizontal cross bar is usually secured to the upper end of each trellis post thereby defining a T-shaped trellis, and parallel trellis wires are supported by the cross bars at a distance spaced outwardly from the center of the post about 18 inches. Although the about T-shaped trellis is the preferred type of trellis, it will be understood that grapes can be mechanically harvested from other types of trellises as well.

Heretofore attempts have been made to harvest trellis supported grapes by forcing the bunches of grapes downwardly so that they hang below the trellis wires and to then advance a planar cutter a few inches below the trellis wire to sever the bunches from the vine. This method of harvesting grapes as disclosed in the Lamouria patent was not too successful since, in the absence of special trellises, many of the bunches and their supporting vines would hang several feet below the trellis wire and accordingly these low hanging vines would also be harvested along with the bunches of grapes. Another difficulty with this type of harvester is that the cutter had to be supported by a free floating head which was controlled so as to follow the downward bowing of the trellis wires between the trellis posts.

The type of grape harvester disclosed by Shepardson utilizes a free rolling generally horizontal wheel which is reciprocated vertically and is provided with radially extending fingers. This harvester likewise has the disadvantage of requiring a free floating supporting head to compensate for the arched configuration of the trellis wire. Also, the radial fingers of this type of machine have a tendency to become entangled in the vines.

SUMMARY OF THE INVENTION

The improved grape harvester of the present invention straddles and is driven along a trellis supported row of grapes to shake the grapes therefrom, collect the grapes in a collecting mechanism, and then convey the grapes to trucks or gondolas which are driven between adjacent rows of grapes in the same direction and at the same speed as the harvester.

The harvester includes two shaking heads, one on each side of the trellis row being harvested, and each shaking head includes at least one row of horizontally extending, vertically spaced fingers. It has been determined that the use of a plurality of vertically spaced fingers, as opposed to a single finger, more positively grips the trellis wire and vines and therefore imparts a sharper shaking action to the bunches. Each head includes a sufficient number of vertically spaced fingers to assure that the trellis wire will be engaged by certain ones of the fingers during each shaking stroke even though the wire assumes an arched configuration between the trellis posts. Thus, the fingers need not be supported on a floating head in order to compensate for sag in the trellis wire.

The fingers in each head are vertically oscillated and at the same time are oscillated in a horizontal plane from an extended position within a vine to a retracted position substantially within an arcuate shield which effects complete stripping of all vines from the fingers. The direction of horizontal oscillatory movement of the fingers when the fingers are in the extended position is opposite to that of the direction of movement of the harvester, and is at such a speed as to impart little if any horizontal movement to the fingers relative to the vines during this shaking operation.

Although the preferred form of trellis is a T-trellis as mentioned above, the apparatus is also adapted to operate on a trellis having a single wire centered on top of the trellis posts, or disposed to one side of the posts. When operating upon these single wire trellises, one of the heads is inactivated with its shaking fingers in a retracted position while the other shaking head is adjusted horizontally so that the shaking fingers will engage the single wire during the shaking operation.

In order to prevent interference between the fingers and the trellis posts or vine stumps, a sensing finger is operatively connected to the power unit of the shaking heads and upon contacting a trellis post or vine stump, stops the shaking fingers in a retracted position thereby allowing the harvester to move the fingers past the posts or vine stump. After moving past the trellis posts, the sensing finger moves out of engagement with the post or vine stump permitting the shaking heads to resume normal operation.

The bunches of grapes and individual berries that are shaken from the vine fall into a collecting mechanism which includes two inclined members which are normally resiliently urged together and which are forced apart by the trellis posts and vines stumps as they move therebetween. The collected grapes are then conveyed into trucks or gondolas for transportation to the winery.

BRIEF DESCRIPTION OF THE DRAWINGS

FIGURE 1 is a diagrammatic side elevation of the grape harvester of the present invention illustrating certain drive parts and conveyors associated therewith, certain parts being cut away and other parts being shown in section.

FIGURE 2 is a diagrammatic plan view of FIGURE 1.

FIGURE 3 is a diagrammatic front elevation of the harvester, a portion of one side of the harvester being removed to illustrate the grape collecting mechanism and conveying system.

FIGURE 4 is a perspective of a portion of the collecting mechanism and conveying system.

FIGURE 5 is an enlarged front view of one of the shaking heads with a fragment of a curved vine shield being removed, said view being taken looking in the direction of arrows 5—5 of FIGURE 3.

FIGURE 6 is a vertical section taken substantially along lines 6—6 of FIGURE 5, the curved portion of the shield being shown in central section.

FIGURE 7 is a horizontal section of the shaking head of FIGURE 5, the view being taken along line 7—7 of FIGURE 6.

FIGURE 8 is a vertical section taken along lines 8—8 of FIGURE 6.

FIGURE 9 is a perspective illustrating a portion of the shaking head and shield.

FIGURE 10 is a diagrammatic view illustrating the hydraulic and electrical controls for the shaking heads.

FIGURE 11 is an enlarged perspective illustrating one of the mowers which severs the non-producing canes from the vines adjacent the collecting mechanism.

FIGURE 12 is a diagrammatic rear view of the harvester shown straddling one row and illustrating a conveying system for discharging the harvested grapes into a truck moving between adjacent rows.

FIGURE 13 is an enlarged section taken along lines 13—13 of FIGURES 12 and 14 illustrating a foldable conveyor extension.

FIGURE 14 is a section taken along lines 14—14 of FIGURE 13 illustrating the extension in full lines in the operative position and in phantom lines in an inoperative position.

FIGURES 15 and 16 are operational views in plan and in elevation, respectively, illustrating the fingers in fully extended positions and at the upper ends of their stroke.

FIGURES 17 and 18 are operational views similar to FIGURES 15 and 16 but with the fingers rotated 90° from the fully extended position and disposed at the bottom of their stroke.

FIGURES 19 and 20 are operational views illustrating the fingers fully retracted and in alignment with the trellis post.

FIGURES 21 and 22 are operational views similar to FIGURES 15 and 16 but showing the harvester adjusted to handle grapes on a single wire trellis system.

FIGURE 23 is a diagrammatic side elevation illustrating a bowed trellis and the ability of the shaking heads to handle the same without requiring adjustment, the shaker being shown in two positions.

DESCRIPTION OF THE PREFERRED EMBODIMENT

The grape harvester 30 (FIGS. 1 to 3) of the present invention comprises a high rise mobile frame 32 mounted on two drive wheels 34 and two steerable wheels 36. The harvester straddles a row of grapes which are supported preferably by trellis wires 38 (FIG. 3) connected as by stapling on T-shaped trellis posts 40 which are usually spaced about eight feet apart and are placed immediately adjacent the stumps of the grape vines which are also spaced about eight feet apart. The harvester includes a pair of spaced shaking heads 42 which are disposed on opposite sides of the trellis and shake the wires to dislodge the grapes therefrom. The grapes drop onto a collecting mechanism 44 in the form of bunches or as individual berries and are then advanced onto a conveying system 46 into gondolas or trucks 48 (FIG. 12) for transportation to the winery.

As indicated in the drawings, the frame 32 is of generally U-shaped construction having a general horizontal platform 50 disposed above the trellis wires 38, and a pair of rear wheel supporting columns 52 rigid with and projecting downwardly from the platform 50 on opposite sides of the row of grapes. Three vertical support members 54, 54a and 54b are rigid with and project downwardly from the platform 50 on each side of the trellis, only a fragment of the member 54b being shown in FIGURE 3. The lower ends of members 54 and 54b are connected together by generally rectangular box frames 56 of a portion of the conveying system 46. The front or steerable wheels 36 are journaled in yokes 58 which are connected to generally vertical shafts that are, in turn, journaled in vertical legs 60 of an inverted U-shape pivot frame 62 that is pivotally connected to the front end of the platform 50 by a horizontal pivot pin 64. Vine deflecting fenders 66 are disposed forwardly of the steerable wheels 36 and are connected to the associated legs 60 by straps 68.

The operative components of the harvester are powered by an engine 70 which includes a clutch 72 coupled to a hydraulic propulsion pump 74 by a belt drive 75. The pump 74 drives a hydraulic motor 76 which is coupled to a transmission 77 that is connected to a differential 78 which drives rear axles 80 that are connected to the drive wheels 34 by chain drives 82. A steering wheel 86, which is connected to the front wheels 36 by suitable linkages 88, and an operator's seat 90 are placed near the front of the harvester adjacent the usual engine, transmission, and hydraulic power unit controls (not shown) thereby locating the operator in position to accurately guide the harvester 30 down the trellis row being harvested.

The belt drive 75 is also coupled to a second hydraulic pump 92 which drives the hydraulic motor 93 (FIG. 2) which supplies power to the different components of the conveyor system 46. The pump 92 also supplies power to the two shaking heads 42 as will be described in more detail later.

As best illustrated in FIGURE 4, the collecting mechanism 44 is formed into segments 44a and 44b which are normally contacting each other but will separate from each other to permit the trellis posts 40 and line stumps to pass therebetween. Each segment comprises an upwardly and outwardly inclined collecting conveyor 102 trained around rollers mounted on shafts 104 and 106 (FIG. 3) that are journaled in the associated frame 56. The upper run of each conveyor 102 is driven upwardly and outwardly as will be described hereinafter.

An important feature of the invention is that a flexible resilient deflector 114 is secured to the lower end of each conveyor frame 56 by straps 110 and is normally contacting the deflector 114 of the other segment 44a or 44b of the collecting mechanism 44. Thus, the two deflectors 114 cooperate to define an inverted V-shaped deflector which reliably directs individual grapes or bunches of grapes into either of the collecting conveyors 102. Because the two resilient deflectors are normally held together, the grapes are not permitted to pass between the two resilient deflectors onto the ground and thus be wasted.

In order to guide the trellis posts 40 and vine stumps between the flexible deflectors 114, the leading end 116 of each deflector is preferably spirally wound and connected together as by bolting with the axis of generation of each spiral being angled downwardly, outwardly, and forwardly. Because of the rounded curvature, the inclination of the leading edge, and the relative flexible nature of the deflectors 114, the deflectors reliably guide the grape stumps and trellis posts 40 into and between the flexible deflectors without injury to the stumps or posts. Also, the flexible nature of the deflectors 114, which deflectors may be constructed of rubber coated fiber belting or the like, is such that the presence of a post or stump therebetween opens the deflectors only a short, distance forwardly and rearwardly of the stump and post as indicated in FIGURE 4.

The cross bars or slats 120 on the conveyor 102 collect the grapes and move them upwardly to endless elevating conveyors 122 or 124. The conveyors 122 and 124 are disposed on opposite sides of the harvester and are substantially the same in construction. Accordingly, only the elevating conveyor 122 will be described in detail, and parts of the elevating conveyor 124 that are similar to parts of the conveyor 122 will be assigned the same numerals followed by the letter *a*.

The conveyor 122 is fitted within a generally L-shaped housing 126 that is rigidly secured to the frame 32 by the associated vertical support members 54, 54a and by brackets 128 secured to the adjacent wheel supporting columns 52. An endless belt 130 having evenly spaced bars or slats 132 secured thereto is trained around idler rollers 134 and 136 (FIG. 1) and around a drive roller 138 keyed to a shaft 139. As indicated in FIGURE 3, the outer vertical edges of the slats 132 are cut away at 140 to receive guide rails 142 (FIG. 1), which rails guide the upper run of the conveyor belt 130 from a horizontal to an upwardly inclined position without loss of tension in the conveyor belt.

The upper runs of the elevating conveyors 122 and 124 are driven rearwardly and upwardly thereby moving the grapes from associated conveyors 102 and discharging them at the upper ends of elevating conveyors 122 and 124 through chutes 144 onto a transversely extending discharge conveyor 146 (FIGS. 1, 2 and 12 to 14). The discharge conveyor 146 is disposed within a conveyor channel or well 148 which is secured to the rear end of the platform 50. The discharge conveyor 146 includes an endless slatted belt 150 which is trained around an idler roller 154 and around a drive roller 156 that are keyed to shafts 158 and 160 respectively, journaled in the channel 148. Although the upper run of the conveyor 146 may be driven in either direction in accordance with customer preference, the drawings illustrate a discharge conveyor having its upper run driven to the right (FIG. 12).

A foldable extension conveyor 166 is provided in order to move the grapes transversely over the next trellis row for discharge into the truck 48. The extension conveyor 166 includes an endless slatted belt 167 trained around an idler roller 168 and a driven roller 170, which rollers are keyed to shafts 171 and 172, respectively, journaled in the side walls of an extension channel 173. The extension channel 173 (FIG. 14) is pivotally supported near the upper portion of one of its ends by the drive shaft 160 of the discharge conveyor 146 and is maintained in a generally horizontal position during operation by an abutment block 174 which is rigidly secured to the lower end of the channel 148. An adjustable screw 175 (FIG. 14) is screwed into the block 174 and abuts an end wall 176 of channel 173 so as to selectively vary the attitude of the extension conveyor 166 during operation. The extension conveyor 166 is driven from the discharge conveyor by a chain drive interconnecting the drive shaft 160 of discharge conveyor 146 with the drive shaft 172 of extension conveyor 166. When the extension conveyor 166 is not being used, it may be pivoted upwardly so as to fold over the discharge conveyor 146 as indicated in dotted lines in FIGURE 14.

As mentioned previously, the several conveyors of the conveying system 46 are driven by the hydraulic motor 93 (FIG. 2). The motor 93 is connected to a longitudinally extending line shaft 180 (FIGS. 1, 2 and 3) by a chain drive 182. The shaft 180 is journaled on the platform 50 and has its forward end connected to the drive shaft 104 of the right (FIG. 3) collecting conveyor 102 by a chain drive 183 thereby driving the upper run upwardly and outwardly.

The rear end of the line shaft 180 is connected to a transversely extending line shaft 184 by bevel gears 186, and a second pair of bevel gears 187 connects the transverse line shaft 184 to a longitudinally extending line shaft 188. The line shafts 184 and 188 are journaled on the platform 50, and the bevel gears are so arranged as to drive shaft 180 in a clockwise direction and the shaft 188 in a counterclockwise direction (FIG. 3). The forward end of line shaft 188 is connected to drive shaft 104 of the left (FIG. 3) collecting conveyor 102 by a chain drive 189 thereby driving the upper run of conveyor 102 upwardly and outwardly.

The drive shafts of elevating conveyors 122 and 124 are coupled to a transversely extending shaft 190 which is connected to line shaft 184 by a chain drive 192 (FIG. 2) thereby driving the upper runs of conveyors 122 and 124 upwardly and rearwardly.

The discharge conveyor 146 and extension conveyor 166 receive power from line shaft 188. A chain drive 194 connects one end of an intermediate shaft 196 to the line shaft 188, and a second chain drive 198 connects the intermediate shaft 196 to the drive shaft 160 of discharge conveyor 146 thus driving the upper runs of both the discharge conveyor 146 and extension conveyor 166 to the right (FIG. 12).

In many vineyards, non-bearing canes hang downwardly a sufficient distance from the trellis wire to reach a level on or slightly above the ground level. In order to prevent these long canes from interfering with the collecting mechanism 44 or conveying system 46, mowers 210 (only one being shown in FIGURES 3 and 11) are mounted forwardly of each deflector 114 of the collecting mechanism 44 and sever the low hanging canes from the trellis.

Each mower 210 (FIG. 11) comprises a channel guideway 212 having the usual saw tooth leading edge defined by a plurality of spaced generally conical points 214 having slots therein to receive a reciprocable blade 216. The blade 216 is provided with the usual V-shaped cutting points 215. The channel guideway 212 is supported from the frame 56 of the associated collecting conveyor 102 by brackets 218.

The blade 216 of each mower 210 is driven from the shaft 104 of the associated collecting conveyor 102 by a chain drive 220 which connects the shaft 104 to a stub shaft 222 journaled on the associated frame 56. A disc 226 is keyed to the shaft 222 and has an eccentrically mounted pin 228 projecting therefrom. A link 230 pivotally connects the pin 228 to the cutting blade 216 and accordingly reciprocates the blade thereby cutting any long canes disposed between the V-shaped cutting points 212.

In order to deflect the canes which hang downwardly near the center of the trellis row into position to be cut by the adjacent mower 210, a deflecting finger 232 is pivotally mounted on a pin 234 secured to the channel guideway 212 near the free end of each mower guideway. A torsion spring 235 normally holds the finger 232 in the position shown in FIGURE 11 wherein an arm 236 on the finger hub contacts an abutment pin 238 secured to the guideway 212 and limits counterclockwise movement thereof. If the deflecting finger 232 contacts a trellis post 40 or vine stump, the spring will permit the deflecting finger 232 to pivot clockwise thereby preventing injury to the mower.

Important features of the invention are the ability of the shaking heads 42 to grasp the trellis wires and vines firmly without injury to the vines, to shake the vines and trellis wires by both a downward and an upward motion, and to handle all trellis borne, cane pruned grapes with minor adjustments as determined by the type of trellis used and the particular dimensions thereof.

Since leaves and other light debris falls upon the conveyor 102 during the shaking operation, a blower 240 (FIG. 3) of well-known design is associated with each conveyor 102. Each blower is disposed below the associated conveyor 102 and has an outlet 242 which directs a blast of air under the discharge end of the associated conveyor 102 thereby blowing the debris from the grapes as they fall into the associated elevating conveyor 122 or 124. The blowers may be powered by any suitable means such as by hydraulic motors (not shown).

The two shaking heads 42 are supported by the platform 50 on opposite sides of the trellis 40 as indicated in FIGURE 3, and both heads operate simultaneously when shaking grapes from a two-wire trellis system. It will be understood, however, that one unit may be de-activated and the other unit may be positionally adjusted to handle single wire trellis systems.

Each shaking head 42 (FIGS. 1 and 3) is supported by a carriage 250 which suspends the head from the platform 50 for both horizontal and vertical adjustment relative to the platform. Each carriage 250 includes a pair of vertically extending, inwardly opening channel members 252 which are rigidly connected together at their lower ends by a bar 256. A rectangular tubular slide block 258 is welded to the upper end of each member 252 and is slidably received in horizontal transversely extending channel members 260 that are secured to the lower surface of the platform 50. The slide blocks 258 may be adjusted horizontally within their associated channel members 260 and are locked in adjusted position by capscrews 262 that are threaded into the slide blocks 258 and extend through slots 264 formed in the channel member 260. Stiffening webs 266 are welded to the slide blocks 258 and to the associated vertical channel members 252 to add rigidity to the carriage.

Each shaking head 42 (FIGS. 5 to 9) comprises a sub-frame 270 which includes spaced vertically extending tubes 272 (FIGS. 5 and 7) of rectangular cross section that are slidably received in the vertical channel members 252. The upper and lower ends of the tubes 272 are welded to horizontal channel members 274. Pairs of spaced vertically extending angle members 276 and 278 are welded to and project upwardly from the upper channel members 274. Spaced plates 280 (only one being shown in FIGURE 6) are welded to associated ones of the angle members 276 and 278 and support a hydraulic probe motor 282 and a right angle gear box 283 that are connected together by a coupling 284. Outwardly extending angle members 286 are welded to the upper channel 274 near the outer ends thereof and have inclined channel braces 287 interconnecting the outer ends of the members 286 and the lower channel 274 thereby providing a rigid sub-frame. The sub-frame 270 of each shaking head 42 is preferably enclosed by an upper motor cover 288, an outer inclined shield 290, and an inner arcuate shield 292 all of which are secured to the sub-frame 270 as by bolting. The shield 292 is provided with a vertically elongated slot 293 as best illustrated in FIGURES 5 and 9.

As mentioned previously, each shaking head 42 is mounted for vertical adjustment so as to adapt the harvester to handle grapes on trellises of different heights. In this regard, a pair of hydraulic power units 294 (FIG. 5) have their cylinders pivotally connected to the bar 256 of the associated carriage 250, and have their piston rods pivotally connected to pins 298, which are rigid with the vertical tubes 272 of the associated sub-frame 270 and project through slots 300 in the carriage channel members 252. Thus, the shaking heads 42 may be independently moved to the desired vertical operating position and be locked in adjusted position either hydraulically by hydraulic valves (not shown), or mechanically as by capscrews 301 (FIG. 7) which extend through slots in the carriage channel members 252 and are threaded into the vertical tubes 272 of the sub-frame 270.

Each shaking head 42 (FIGS. 5, 6 and 7) includes a pair of vertically extending stub shafts 312 which are journaled in bearings secured to the upper sub-frame channel 274. The stub shafts 312 each have crank arms 316 rigidly secured to their lower ends and sprockets 318 keyed to their upper ends. The sprockets 318 are connected to a drive sprocket 320 by a chain 322 thereby simultaneously rotating the stub shafts 312, the drive sprocket 320 being keyed to the output shaft of the gear box 283. A fabricated vertically extending motor mounting column 326 has a cross bar 328 welded to its upper end, which bar is pivotally connected to the crank arms 316 by pivot pins 330 secured to the associated arms. Each pivot pin 330 has a collar 332 secured to its lower end as by pinning. A generally cylindrical housing 336 (FIG. 6), having an apertured motor mounting plate 338 welded to one end, forms the central portion of the column 326. A hydraulic motor 340 is molded to the plate 338 and has its shaft 342 projecting outwardly through the plate.

A plurality of horizontally disposed, vertically spaced vine shaking fingers 350 having frusto-conical ends 351 are welded to a finger supporting bar 352 and project through the opening 293 in the arcuate shield 292 in a direction inwardly of the harvester. Two pair of parallelogram linkages 354 are pivotally connected to the column 326 by pins 356, and to the finger supporting bar 352 by pins 358 thereby mounting the fingers 350 for vertical oscillatory movement. The fingers 350 are vertically reciprocated by a counterweighted crank arm 360 which is keyed to the output shaft 342 of the hydraulic motor 340 and has a crank pin 366 projecting outwardly therefrom. A yoke 368 (FIG. 8) is pivotally attached to the crank pin 366 and to one end of a link 372. The other end of the link has a self-aligning bushing therein and is pivotally mounted on a pivot pin 374 that is secured to the finger supporting bar 352 and permits movement of the upper end of the link about the axis of pin 374 as well as in a direction parallel to the axis of the pin.

It will be noted that the vertical motion of the shaking fingers is an oscillatory motion. However, it will be understood that it is within the scope of the invention to mount the fingers for a truly vertical reciprocatory motion.

As best shown in FIGURES 6, 7 and 9, the opening 293 in the arcuate shield 292 is relatively wide so as to permit the fingers 350 to oscillate horizontally while projecting therethrough. In order to prevent vines from entering the opening 293 and following the operation of the fingers, a pivotal gate 380 is disposed within the shield 292. The gate 380 comprises an arcuate face plate 382 which has a narrow vertical slot 384 therein that is sufficiently long to permit vertical oscillation of the fingers 350. The upper and lower edges of the face plate 382 are pivotally supported by arms 386 that are pivoted about bolts 388 screwed into the associated channel members 274. As indicated in FIGURE 7, the sides of the slot 384 are reinforced by bearing blocks 390 which slidably engage the fingers 350 and permit the horizontal oscillatory movement of the fingers 350 to horizontally pivot the gate 380.

As illustrated in hydraulic system 398 and electrical system 399 (FIG. 10) certain electrical and hydraulic controls are provided for controlling the operation of the two shaking heads 42. When the harvester is being moved in the direction of the arrow A. The hydraulic system for the power units 294 which adjust the height of the shaking heads 42, and the system for the propulsion motor 76 and conveyor motor 93 are conventional and will not be described in detail. Since the operation of the harvester 30 is closely controlled by the circuits disclosed in FIGURE 10, the operation and circuits will be described simultaneously.

Assuming that the grapes to be harvested are supported on T-shaped trellises 40 of the type disclosed in FIGURES 15 to 20, the operator first adjusts each shaking head 42 by means of the hydraulic power units 294 (FIG. 5) so that when fingers 350 are at their lowest point in their vertical stroke the associated trellis wire 38 will be disposed between the upper two fingers as indicated in FIGURE 18. The heads 42 are then locked in position either hydraulically or mechanically, and usually need not be repositioned until another vineyard is to be harvested. It will be understood, however, that if the crossbars of the trellis posts are all mounted in an inclined, rather than a horizontal position, one shaking head will be positioned higher than the other, and that the height of each shaking head must be readjusted for each row being harvested. At this time the operator also manually adjusts the shaking heads 42 horizontally and locks them in positions which will provide several inches of clearance between the ends of the trellis crossbars and the shaking fingers 350 when in their retracted positions as indicated in FIGURE 20.

With the heads so adjusted, the operator drives the grape harvester down a trellis row. The operator then positions the cores 400 and 402 of manually actuated valves 404 and 406 in their cross passage position as indicated in FIGURE 10. High pressure fluid then flows from the pump 92, through valve 404, through the left shaker motor 340, through conduit 407, through the cross passages in core 408 of solenoid valve 410, and through the left probe motor 282. Fluid discharged from the left probe motor 282 flows through conduit 412 past an accumulator 414, through a cross passage in core 408 of solenoid valve 410, through conduit 416, through the core 400 of manual valve 404 and returns to the sump 418 through conduit 420. Thus, the left shaker motor 340 and the left probe motor 282 are both driven at maximum speed thereby simultaneously oscillating the left shaker fingers 350 vertically and horizontally, the horizontal movement being in the direction indicated by arrows in FIGURES 10 and 15 to 17.

If it is desired to operate both left motors 340 and 282 at a slower speed, the core 400 of the manual valve 404 is moved into a position where the cross-passages in the core 400 are not fully registered with the conduits connected to the valve 404. If it is desired to control the speed of the left probe motor 282 relative to the left shaker motor 340, the core 424 of a manual by-pass valve 426 is adjusted so that the passage 428 in the core 426 will either fully or partially register with a by-pass conduit 430 that is connected between conduit 407 and 416. If it is desired to stop both left motors 282 and 340, the core 400 of manual valve 404 is shifted to a position wherein the passage 432 registers with the pump supply line 433 and return conduit 420.

The right shaker motor 340 and right probe motor 282 are controlled independently of, but in the same manner as, the left motors by manual control valve 406, a solenoid valve 434, and a manual by-pass valve 436. The core 438 of the solenoid valve 434 as shown in FIGURE 10 is shifted to a by-pass position thereby deactivating the right probe motor 282 so that the horizontal oscillation of the fingers 350 of the right shaker head 42 will be temporarily stopped to allow the right fingers 350 to move past the crossbar of the adjacent trellis post 40 without contacting the same as illustrated in FIGURES 19 and 20.

Having reference to FIGURE 10, it will be noted that the harvester 30 has moved forwardly an amount sufficient for a pivotally mounted post sensing finger 440 to contact the stump of a vine and pivot the lobe 442 of a cam 444 into position to close a normally open switch 446. The finger 440 and switch 446 are supported on one of the conveyor frames 56 (FIG. 3) and are located about 12 inches forward of a transverse vertical plane 448 (FIG. 10) that passes through the center of both shaking heads. A normally open switch 450 is associated with the left shaking head and is closed by a cam 452 keyed to one of the shafts 312 when the left shaking fingers 350 are in their retracted positions. Similarly, a normally open switch 454 is associated with the right shaking head and is closed by a cam 456 keyed to one of the shafts 312 of the right head 42 when the right shaking fingers 350 are in their retracted positions as shown in FIGURE 10.

During a normal shaking operation, the solenoid 410a of solenoid valve 410 is normally energized to hold the core 408 in the cross-passage position through a circuit which receives direct current from a power source 460. The current flows through a closed master switch 462, through a normally closed contact LR–1 of left relay LR, through the solenoid 410a, and is grounded at 464. Similarly, the solenoid 434a of solenoid valve 434 is normally energized to hold the core 438 in the cross-passage position through a circuit which receives direct current from power source 460. The current flows through the switch 462, through a normally closed contact RR–1 of right relay RR, through solenoid 434a, and is grounded at 464.

When both the sensing finger switch 446 and right shaker head switch 454 are closed, power flows from source 460, through closed switches 462, 446, and 454, through the coil of relay RR thereby energizing the same, and is grounded at 464. Energization of relay RR opens relay contact RR–1 thereby de-energizing solenoid 434a permitting a spring to urge the core 438 of valve 434 to the by-pass position illustrated in FIGURE 10 thereby stopping right probe motor 282. Thus, when both the sensing switch and right shaking head switch are closed, the right shaking finger 350 will be held in a retracted position until the sensing finger moves past both the vine stump and post 40 thereby permitting switch 446 to again open.

With the parts positioned as shown in FIGURE 10, the right fingers 350 will oscillate another 180° and cam 452 will then close switch 450 thereby energizing relay LR, opening relay contact LR–1, deenergizing solenoid 410a, and locking the right fingers in the retracted position until the sensing finger 440 moves past the vine stump and post at which time the shaking fingers 350 will be about 6 inches forward of the post 40. After the sensing finger 440 moves past the post 40 and switch 446 opens, relays LR and RR will be deenergized thereby closing relay contacts LR–1 and RR–1. Solenoids 410a and 434a will then be energized causing the valve cores 408 and 438 to move to their cross-passage position. Hydraulic fluids will then flow through both probe motors 282 and will again cause the right and left fingers 350 to oscillate horizontally and accordingly, resume operation.

During normal operation the shaker motors 282 vertically oscillate the fingers in each head through a stroke of about 6 inches and at the rate of between about 425 to 525 cycles per minute. The probe motors horizontally oscillate the fingers at the rate of between about 90 to 150 cycles per minute. When operated as above indicated, the forward speed of the harvester 30 is between about 1 to 2 miles per hour, depending upon the quantity and type of grapes to be harvested. Thus, by virtue of the hydraulic system 398, electrical system 399, and standard controls for the engine 70, the shaking heads may be operated independently of each other and each head may be oscillated both horizontally and vertically at the optimum rate for the particular variety of grapes being harvested. The hydraulic and electrical system will also terminate horizontal oscillation of the shaking fingers 350 stopping the fingers in their retracted positions as the shaking heads move past the trellis posts as best shown in FIGURE 19.

As diagrammatically illustrated in FIGURE 23, the weight of the grapes causes the trellis wires 38 to bow downwardly between the trellis posts 40. However, because the shaking fingers 350 are vertically spaced, each trellis wire 38 will be positioned between an upper pair of fingers when near the trellis posts and between a lower pair of fingers when midway between the adjacent trellis posts as clearly indicated in FIGURE 23. It will also be appreciated that since the wire is disposed between two of the fingers 350, that the wire will be shook during the downstroke as well as during the up stroke of the fingers.

FIGURES 21 and 22 illustrate that the shaking heads 42 of the harvester 30 may be adjusted to harvest grapes from single wire trellises. As indicated, a single wire 38a is fitted within a slot in the upper end of a trellis post 40a. One of the shaking heads 42a is then adjusted horizontally and locked in place a few inches from the trellis wire, and the other head 42b is moved to an inoperative position spaced from the wire. Thus, the left head 42a shakes the grapes from the vine, and the right probe motor 282 and right shaker motor 340 (FIG. 10) are inactivated at this time by shifting the core 402 of the valve 406 to the parallel passage position.

From the foregoing description it will be apparent that the grape harvester of the present invention is capable of being adjusted to handle grapes on double wire or single wire trellises. The shaking fingers are disposed in a vertical row of sufficient length to accommodate the sag in the trellis wire without requiring vertical adjustment. The vertical oscillations of the fingers shake the vine upon both upward and downward movement and the horizontal oscillation of the fingers move the fingers when extended in a direction which is opposite to the direction of movement of the harvester. The harvester also includes a collecting mechanism which includes a pair of contacting flexible deflectors that separate to permit the trellis posts and vine stumps to move therebetween.

Although the best mode contemplated for carrying out the present invention has been herein shown and described, it will be apparent that modification and variation may be made without departing from what is regarded to be the subject matter of the invention as set forth in the appended claims.

Having completed a detailed description of the invention so that those skilled in the art could practice the same, I claim:

1. An apparatus for harvesting fruit from vines supported by a trellis wire comprising a mobile vehicle movable parallel to a row of vines in a predetermined direction, a plurality of horizontally elongated vertically spaced shaking fingers, means for imparting a generally horizontal curvilinear motion to said fingers for alternately causing said fingers to enter the vines and to withdraw from said vines to permit continuous advancement of the vehicle in said predetermined direction without injury to the vines, means for maintaining the longitudinal axes of said shaking fingers normal to said predetermined direction during horizontal movement thereof, and means for repeatedly moving said fingers vertically through a predetermined stroke for engaging and shaking the trellis wire and vine to dislodge fruit therefrom.

2. An apparatus according to claim 1 wherein said spaced fingers are parallel, wherein the fingers lie in a common vertical plane passing through the longitudinal axes of said fingers, and wherein the vine penetrating ends of the fingers lie in a common substantially vertical plane.

3. An apparatus according to claim 1 wherein certain of said fingers when in trellis wire engaging position alternately engage upper and lower surfaces of the wire for shaking the wire in response to upward movement as well as in response to downward movement of said fingers.

4. An apparatus according to claim 2 wherein the vines are trained around a trellis wire supported by spaced trellis posts and wherein the trellis wire bows downwardly between the posts, and wherein the uppermost and lowermost ones of said fingers are spaced apart a distance greater than the distance the wire bows from its uppermost to its lowermost positions.

5. An apparatus according to claim 1 wherein spaced trellis posts are provided for supporting the trellis wire, and additionally comprising control means operatively connected to said horizontal moving means for accommodating horizontal movement of said fingers and for stopping said fingers in position withdrawn from the vine when said fingers are disposed adjacent an obstruction which would preclude normal movement of the fingers.

6. An apparatus for havesting fruit from vines comprising a mobile vehicle movable parallel to a row of vines in a predetermined direction, a shaking head on said vehicle, a vine shield supported by said mobile vehicle and disposed between said head and vine, said shield having an opening therein, a plurality of spaced parallel shaking fingers carried by said shaking head and projectable through said opening, first power means connected to said fingers for imparting a horizontal motion to said fingers relative to said vehicle causing said fingers to alternately enter and withdraw from said vine, and second power means connected to said fingers for repeatedly moving said fingers through a predetermined stroke in a vertical plane while said fingers are being moved horizontally thereby alternately projecting the fingers into the vine for shaking the vine to dislodge fruit therefrom and retracting the fingers relative to the shield to positively dislodge the vines therefrom.

7. An apparatus for harvesting fruit from vines which are trained around a pair of spaced wires supported on opposite sides of spaced trellis posts comprising a mobile vehicle straddling a row of vines and movable parallel to the row in a predetermined direction; a shaking head disposed on each side of the trellis row; a set of elongated spaced parallel shaking fingers in each head; each shaking head including means for imparting a horizontal curvilinear motion to said fingers for alternately causing said fingers to enter the vines and to withdraw from the vines on the adjacent side of said row to allow continuous advancement of the vehicle in said predetermined direction without injury to the vine, means for maintaining the longitudinal axes of said shaking fingers normal to said predetermined direction during horizontal movement thereof, and each shaking head including means for repeatedly moving said fingers through a predetermined vertical stroke for engaging and shaking the adjacent trellis wire and vine to dislodge fruit therefrom.

8. An apparatus according to claim 7 wherein said spaced parallel fingers lie in a common vertical plane passing through the longitudinal axes of said fingers and at all times extending transversely in the direction of movement of said vehicle.

9. An apparatus according to claim 7 wherein certain of said fingers when in trellis wire engaging position engage upper and lower surfaces of the wire for shaking the wire in response to upward movement as well as in response to downward movement of said fingers.

10. An apparatus according to claim 7 wherein the vines are trained around trellis wires supported by spaced trellis posts and wherein the trellis wires bow downwardly between posts, and wherein the uppermost and lowermost ones of the fingers of each head are spaced apart a distance greater than the distance each wire bows from its uppermost to its lowermost position.

References Cited
UNITED STATES PATENTS

| | | | |
|---|---|---|---|
| 827,288 | 7/1906 | Bowditch | 56—46 |
| 2,544,443 | 3/1951 | Brateng | 56—330 |
| 2,925,687 | 2/1960 | Pronio et al. | 47—1 |
| 3,225,530 | 12/1965 | Weygandt et al. | 56—330 |
| 3,245,211 | 4/1966 | Weygandt et al. | 56—330 |
| 3,255,578 | 6/1966 | Pertics | 56—330 |
| 3,325,984 | 6/1967 | Christi et al. | 56—330 |
| 3,328,944 | 7/1967 | Shepardson | 56—331 |
| 3,344,591 | 10/1967 | Christie et al. | 56—330 |
| 3,380,236 | 4/1968 | Shepardson | 56—330 |
| 3,396,521 | 8/1968 | McKibben et al. | 56—330 |

RUSSELL R. KINSEY, Primary Examiner